Sept. 15, 1942.  R. B. COTTRELL  2,295,555
TRUCK
Filed March 13, 1941  4 Sheets-Sheet 1

INVENTOR.
Robert B. Cottrell
BY
Atty.

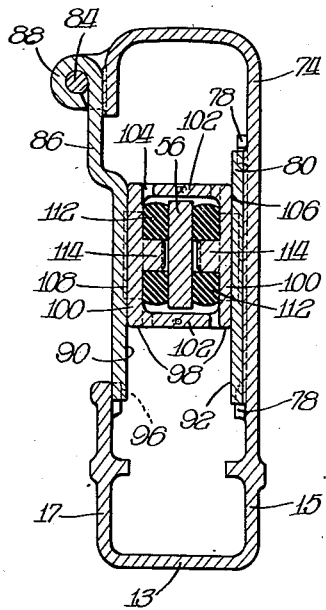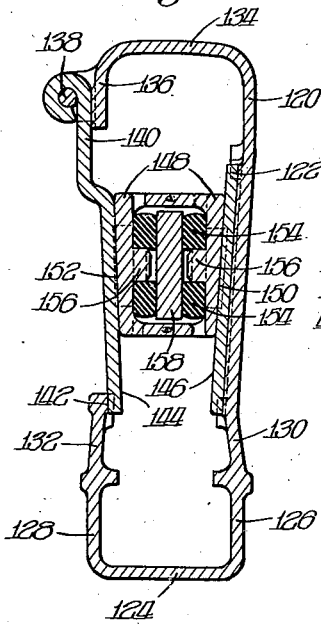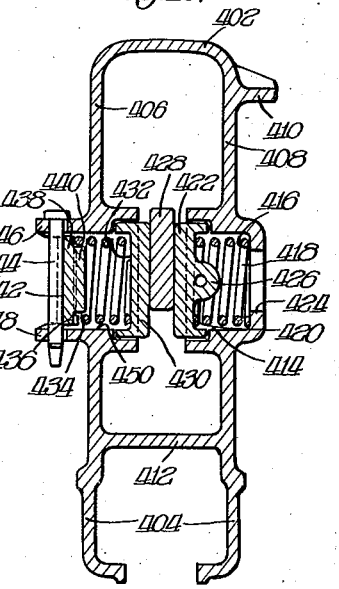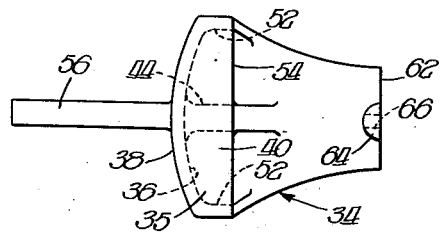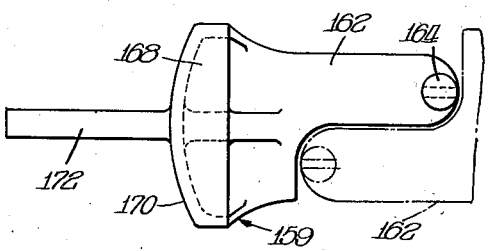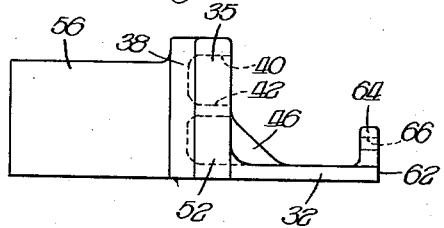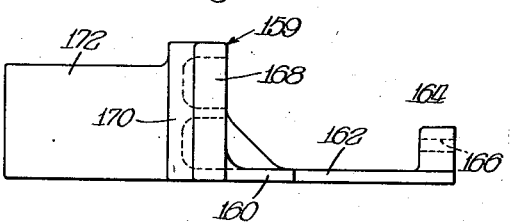

Sept. 15, 1942.　　　R. B. COTTRELL　　　2,295,555
TRUCK
Filed March 13, 1941　　　4 Sheets-Sheet 3
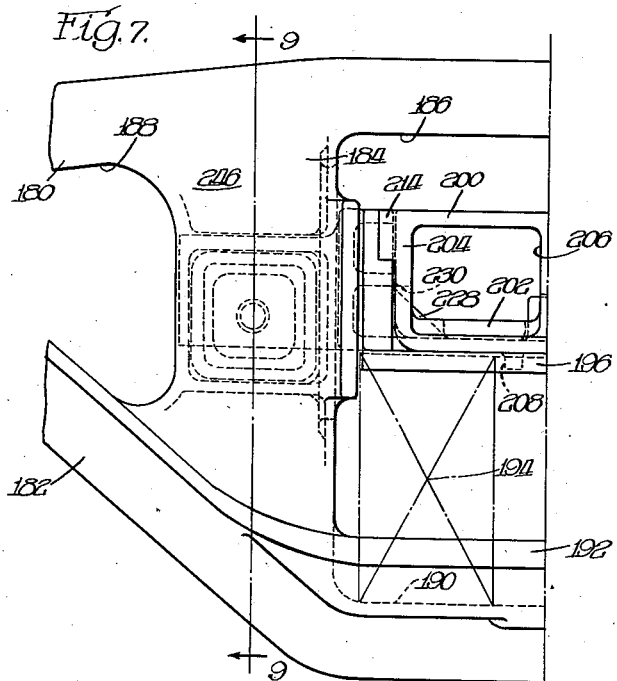
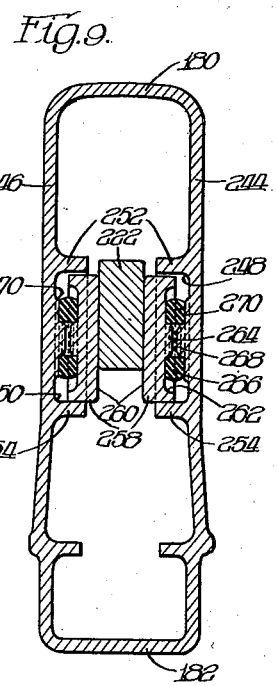
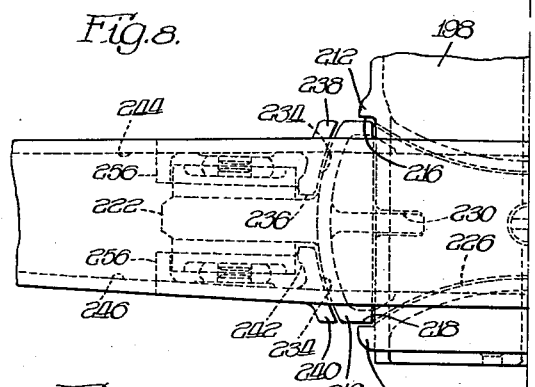
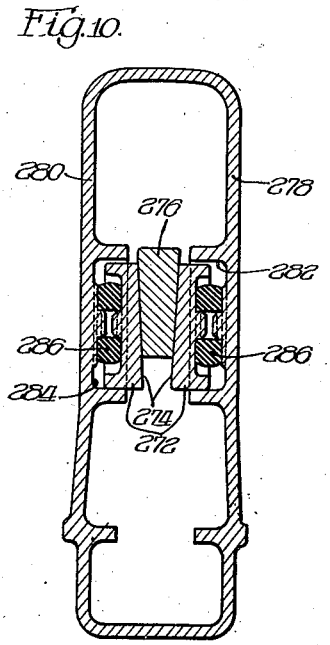
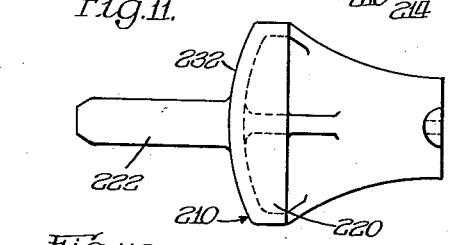
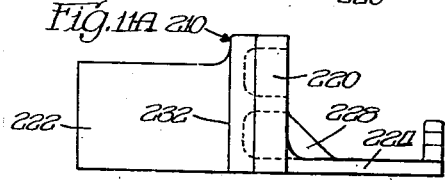
INVENTOR.
Robert B. Cottrell
BY
Atty.

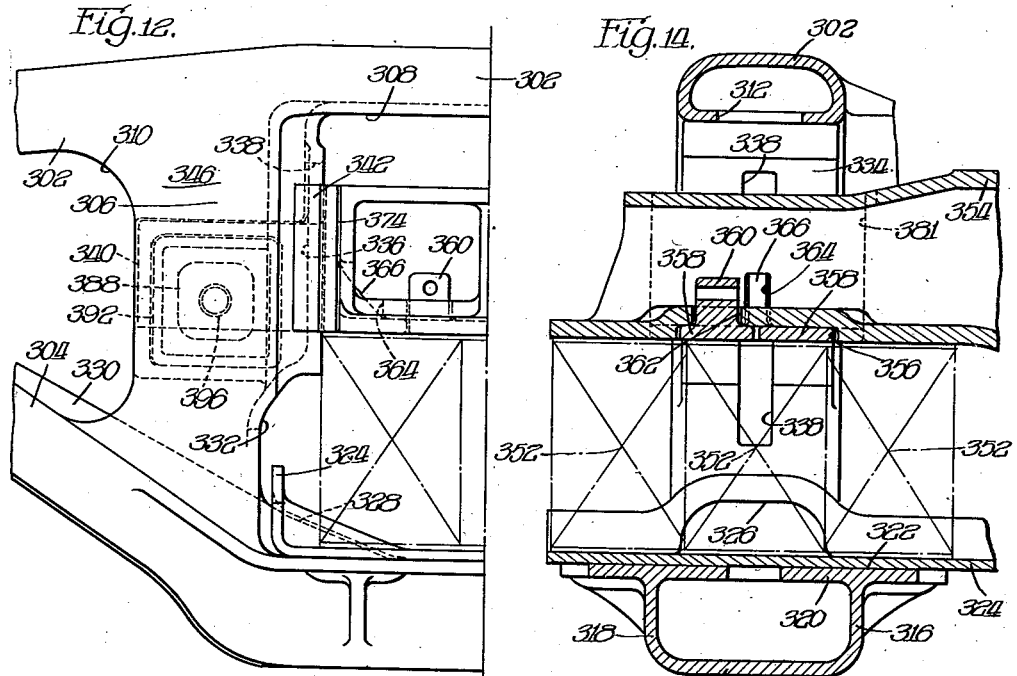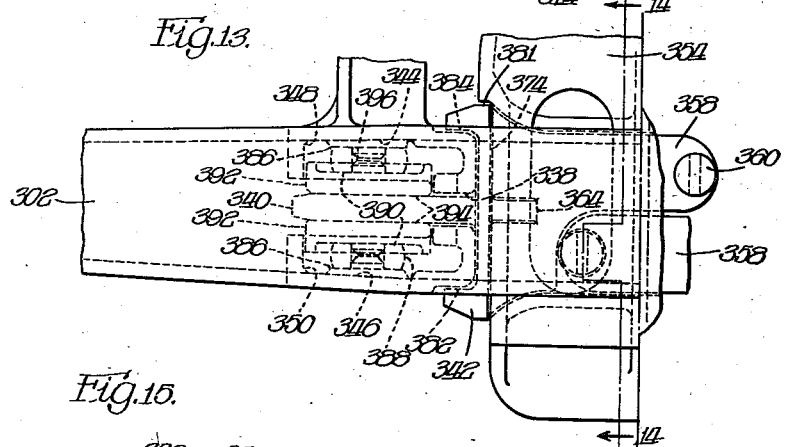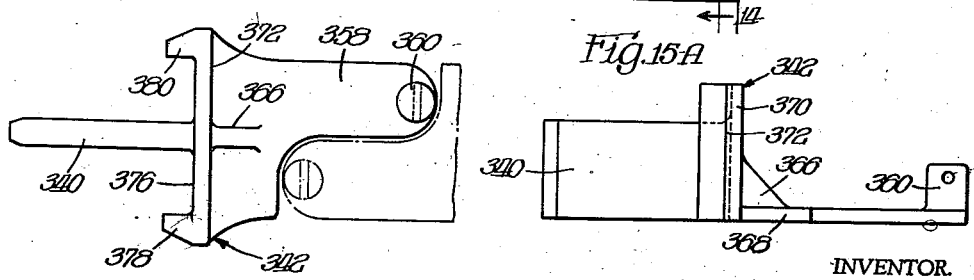

Patented Sept. 15, 1942

2,295,555

UNITED STATES PATENT OFFICE 2,295,555

TRUCK

Robert B. Cottrell, Chicago, Ill., assignor to American Steel Foundries, Chicago, Ill., a corporation of New Jersey Application March 13, 1941, Serial No. 383,065

26 Claims. (Cl. 105—197)

My invention concerns railway car trucks and especially a known form of such truck which utilizes spaced side frames and a connecting bolster with tying means between said bolster and side frames in the form of a two-piece insert or interlocking member.

The general purpose of my invention is to improve such a form of railway car truck in such manner as to afford a ride control means in conjunction therewith which may utilize resilient means as well as frictional absorption to dampen the action of the bolster supporting springs and to serve as additional means of squaring the car truck members.

A definite object of my invention is to afford integral arms on said bolster insert members which may extend between the adjacent columns and have engagement therewith as squaring instrumentalities in the truck structure, and which also extend through said columns to have engagement with friction absorbing devices which may serve to dampen the spring oscillations. In a further embodiment of my novel arrangement said insert member extension may project through the columns of the side frame and may carry friction shoes for engagement with friction panels which may be supported in the window openings outwardly of the columns at each end of each side frame.

In a still different embodiment my novel arrangement may comprise insert members wherein the control operating arms may support friction shoes for engagement by the friction panels inclined somewhat with respect to each other, and this inclination may be such as to increase the amount of frictional absorption as the bolster moves upwardly or, if desired, to increase it as the bolster moves in a downward direction.

A still different object of my invention is to devise such a novel arrangement as that described wherein friction shoes may be supported in the columns of the side frame in such manner that the column insert control arms may have frictional engagement therewith as said control arms move vertically with the bolster. In this last-mentioned arrangement I may modify the shoes or the control bar so that the friction surfaces may taper with respect to each other, thus affording a frictional increment as the bolster moves in one direction or other as may be desired. In this latter arrangement also I may support said friction shoes outwardly of the columns instead of directly in the columns in order to improve accessibility.

In the drawings,

Figure 2 is a fragmentary top plan view of the truck structure shown in Figure 1, only one end portion being shown inasmuch as the other end arrangement is similar.

Figure 3 is a sectional view through the truck structure shown in Figures 1 and 2, the section being taken substantially in the transverse vertical plane indicated by the line 3—3 of Figure 1.

Figure 4 is a sectional view comparable to that shown in Figure 3 but modified to show tapering surfaces on the friction panels instead of parallel surfaces.

Figure 5 is a top plan view of my novel form of bolster and side frame insert member, and Figure 5A is a side elevation thereof.

Figure 6 is a top plan view of a modified form of bolster and side frame interlocking and control member, and Figure 6A is a side elevation thereof.

Figure 7 is a fragmentary side elevation of a railway car truck embodying a modified form of my invention, only one end of the truck structure being shown and the end portion of the side frame being cut away.

Figure 8 is a fragmentary top plan view of the side frame and bolster connection in the truck structure shown in Figure 7.

Figure 9 is a sectional view through the truck structure shown in Figures 7 and 8, the section being taken substantially in the transverse vertical plane as indicated by the line 9—9 of Figure 7.

Figure 10 is a sectional view comparable to Figure 9 showing a modified arrangement.

Figure 11 is a top plan view of the bolster interlocking and control member used in the strucure shown in Figures 7 and 8.

Figure 11A is a side elevation of the member shown in Figure 11.

Figure 12 is a fragmentary side elevation of a railway car truck utilizing a further embodiment of my novel arrangement.

Figure 13 is a fragmentary top plan view of the truck arrangement shown in Figure 12, and Figure 14 is a sectional view therethrough substantially in the vertical transverse planes indicated by the line 14—14 of Figure 13.

Figures 15 and 15A show respectively a plan view and side elevation of the interlocking and control member utilized in the truck arrangement shown in Figures 12 and 13.

Figure 16 shows a sectional view corresponding in general with the sectional view of Figure 9 and showing an alternate arrangement wherein coil springs may be used instead of rubber pads.

Figure 1:
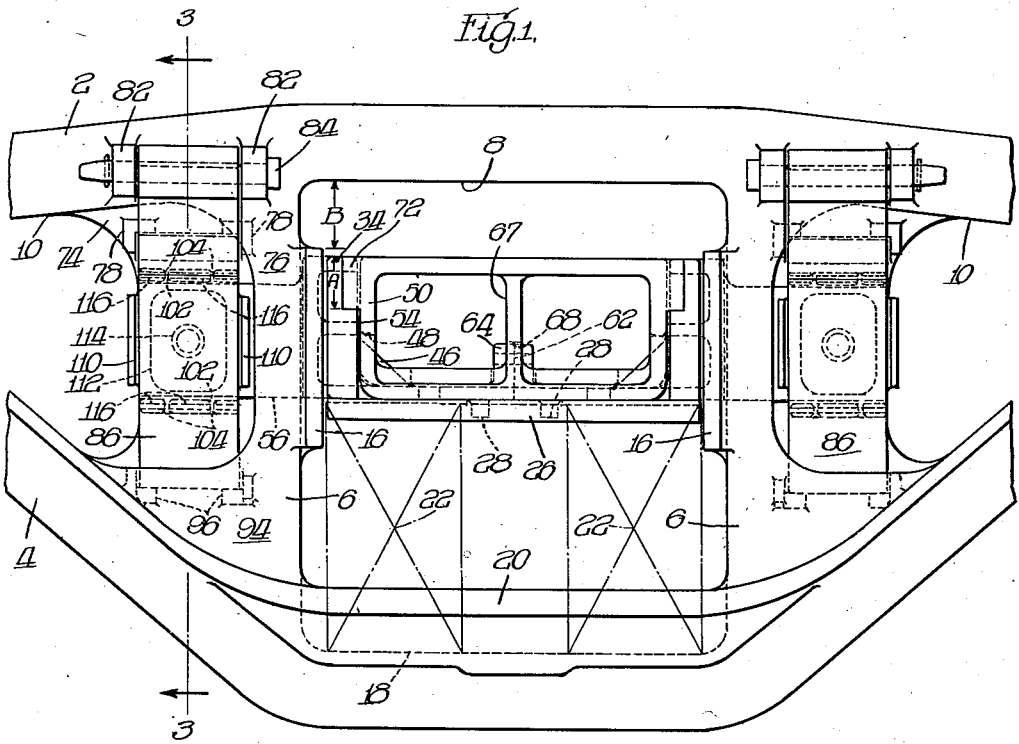
Figure 1 is a fragmentary side elevation of a railway freight car structure embodying my invention, the end portions of the side frame being cut away as not pertinent to my invention.
Figure 2:
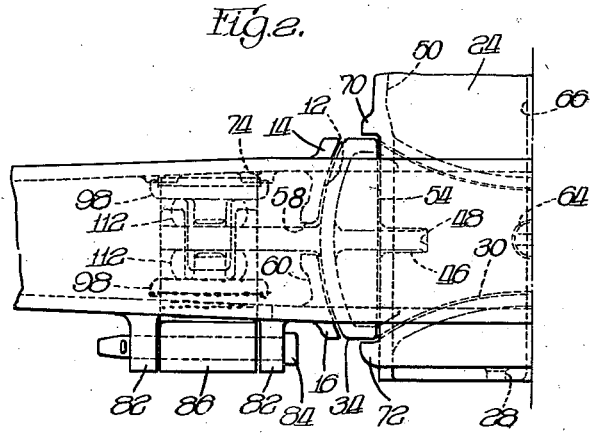

Referring in detail first to the embodiment shown in Figures 1 to 6 inclusive, the side frame is a well-known truss structure having the compression member 2, the tension member 4, and spaced columns 6, 6 merging therewith to form the central bolster opening 8 and spaced window openings 10, 10. Said bolster opening has a substantially constant width top and bottom thereof interrupted along the upper central portion by a bolster guide surface 12 of arcuate form, said guide surface being defined laterally thereof by the inboard and outboard vertical flanges 14 and 16, thus affording guide surface of maximum area. The tension member beneath the bolster opening may be of box-section with a bottom web 13, inboard and outboard walls 15 and 17 (Figure 3) and a widened top web forming a spring seat 18 defined by inboard and outboard upstanding flanges 20, 20, said flanges serving as positioning means for the coil springs diagrammatically indicated at 22. On the springs 22 may be supported the end of the bolster 24 which projects into said bolster opening 8, said bolster end being seated on the spring plate 26 and positioned with respect thereto by the downwardly projecting lugs 28, 28. The bolster end is relatively narrow as compared with the width of the bolster opening, and the bottom wall thereof may be recessed as at 30 for reception of the base plate 32 (Figure 5A) of the bolster and side frame interlocking and control member formed in symmetric halves, each half being generally designated 34. Each control member comprises a central upright member 35 having an arcuate wall 36 affording on its outer face 38 an arcuate guide surface for engagement with the complementary arcuate guide surface 12 on the adjacent column. The upright member 35 is defined by a top wall 40, a horizontal web 42, and a vertical web 44, the lower portion of which is continuous with the central rib 46 which may project into the slot 48 (Figure 1) formed in the adjacent lateral wall 50 of the bolster end. The upright member 35 comprises also spaced inboard and outboard walls 52, 52, the edges of which are aligned with the edges of the top wall 40 and the intermediate web 42 to form a convenient abutment as at 54 (Figure 2) for the adjacent side wall 50 of the bolster end. Each interlocking member 34 is formed with a vertical end plate or control arm 56 projecting from the vertical portion 35 centrally thereof and aligned with the before-mentioned vertical reinforcing web 44, said control arm 56 having a depth slightly less than the height of the central portion 35. The control arm 56 is a rectangular plate member of convenient form for projection through the vertical slot 58 formed in the central web 60 of the adjacent column, the slots 58, 58 in the columns at opposite sides of the frame having vertical depth sufficient to permit normal play of the bolster end in the bolster opening, and in the truck shown the spring travel afforded is relatively large as compared with the usually accepted A. A. R. standards.

The interlocking members 34, 34 utilized in each bolster opening may abut each other as at 62 along plane surfaces and centrally of their abutting ends each may be formed with an upstanding stud or lug 64 which may extend through the bottom wall of the bolster (Figure 1). Each lug 64 may have a cotter opening 66 which may conveniently be aligned with the cotter opening of the adjacent lug and said lugs may serve as additional tying means between the bolster and interlocking member, preventing their accidental release when secured by means such as the cotter.

The bolster end is formed with a central vertical web 67 which may be cored away as at 68 to accommodate the before-mentioned stud 64. On each side wall 50 of the bolster may be formed an inboard vertical guide lug 70 extending the depth of the bolster end, and at the extremity of the bolster on said side wall may be formed an outboard vertical guide lug 72 of restricted depth A (Figure 1) less than the depth B at the top of the bolster opening representing the clearance above the interlocking members when seated on the spring group without the superposed weight of the bolster or car body so that the bolster may be disengaged from the interlocking members, elevated and withdrawn from the bolster opening without disturbing the position of the interlocking members or the spring group therebelow.

Each column may be defined by the before-mentioned transverse central web 60 of arcuate form together with a relatively wide inboard wall 74 and a relatively narrow outboard wall or web 76. On the inboard web 74 may be formed top and bottom spaced lugs 78, 78 serving as positioning means for an inboard friction plate 80 which may be positioned therebetween. On the compression member 2 above each window opening 10 may be formed spaced outwardly projecting lugs 82, 82, and through aligned openings therein may extend the securing pin 84 serving as support means for the outboard friction panel 86, said panel being formed at the top with an ear or hinge portion 88 for that purpose. On the inboard face of the panel 86 may be formed a friction surface 90 having spaced parallel relationship with the friction surface 92 formed on the outboard face of the before-mentioned plate 80. The outboard web 76 of the column may be widened considerably to merge as at 94 in a gusset-like portion with the outboard web of the tension member and on said gusset-like portion may be formed the spaced lugs 96, 96 serving as positioning means for the lower end of the outboard friction panel 86.

Each end portion 56 of the interlocking member 34 projects through the slot 58 of the adjacent column in a position between the spaced friction surfaces 90 and 92 as best seen in the sectional view of Figure 3, thus serving as actuating means for the spaced inboard and outboard friction shoes 98, 98, said friction shoes having vertical plate portions 100, 100 and overlapping fingers or lugs 102 and 104 at their opposite ends, each shoe being formed with spaced lugs 104, 104 at one end and an intermediate lug 102 at the opposite end. Each inboard shoe may have frictional engagement as at 106 with the before-mentioned friction surface 92 and each outboard shoe may have frictional engagement as at 108 with the opposite friction surface 90. Each shoe 98 may be formed along its lateral edges with vertical flanges 110, 110 which may have guiding engagement with the lateral edges of the friction plates 80 and 86 against which they seat. Between each friction shoe 98 and the adjacent face of the control member end portion 56 may be positioned a rubber spring or resilient pad 112 and each shoe may be formed with a central lug 114 serving as positioning means therefor. In the lugs 102 and 104 may be formed transverse openings 116, 116 which, in the assembly operation, may be forced into alignment so that a pin may be projected therethrough to secure said shoes in position convenient for assembly.

In assembly the interlocking and control members 34, 34 may be placed in position on the spring groups with their end plate portions 56 projecting through the aligned openings in the columns at opposite sides of the bolster opening. Thereafter the rubber pads and friction shoes may be mounted on each end portion 56 and compressed against the inboard plate 80 so that pins may be inserted in the aligned openings 116, 116 of the shoes, after which the lower end of the outboard friction plate 86 may be inserted within the bottom of the opening 10 and swung into position so that the top securing pin 84 may be placed in position.

In the modified arrangement shown in Figure 4 the inboard wall 120 of the side frame column is not vertical but slopes slightly inwardly from top to bottom toward the tension member so that the friction plate 122 supported thereon in manner similar to the previous modification also assumes a slightly diagonal position. As shown the tension member 124 has an inboard web 126, an outboard web 128, the upper portions of which converge slightly as shown at 130 and 132, and the inboard web 126 merges with the wall 120 which extends upwardly to the compression member 134 on whose outboard web 136 may be secured as at 138 the friction panel 140. The lower portion of the friction panel 140 may bear as at 142 against the converging web 132, and the friction surface 144 formed on the inner face of the panel 140 has a converging relationship from top to bottom with the friction surface 146 formed on the opposite friction plate 122. In this modification the friction shoes 148, 148 are formed with slightly tapering friction surfaces on their outer faces which may have engagement as at 150 and 152 with the before-mentioned friction plates, said shoes being otherwise similar to those described for the previous modification. Housed within the shoes 148, 148 are the rubber pads 154, 154 positioned with respect to said shoes by means of the central studs 156, 156, and the adjacent face of the rubber pads or springs 154 may abut opposite faces of the control bar 158 which forms a part of a bolster interlocking member such as that described for the previous modification.

In either of the modifications just described I may utilize a control bar and interlocking insert member 159 of the form shown in Figures 6 and 6A whereof the base plate 160 may assume a somewhat different configuration in order to have complementary relationship with a similar base plate on the opposite insert member. As shown in Figure 6 the member 159 comprises a base plate or a bottom web 160 designed to be recessed in the bottom wall of the associated bolster and includes a tongue-like projection 162 which may have overlapping relationship with the tongue 162 of the associated member 159. At the tip of the tongue portion 162 may be formed a stud 164 designed to project through the bottom wall of the bolster and receive as at 166 an associated cotter key to prevent accidental dismantling of the bolster and interlocking member. The member 159 is otherwise similar to the member 34 previously described and includes a central upright box-section generally designated 168 having on its outer face an arcuate column engaging surface 170 as well as the integral control bar 172 of rectangular form and centrally positioned as previously described.

In the modification shown in Figures 7, 8 and 9 the structure is generally similar to that described for the modification of Figure 1 except that the resilient means and friction absorbing device are housed entirely within the columns of the side frame and the form of the friction device is somewhat modified. In the modification now under consideration the side frame is of truss type with the compression member 180, the tension member 182, and the integral column 184 defining with said members the central bolster opening 186 and the window opening 188 outwardly of the column. The tension member beneath the bolster opening may have the general arrangement shown in the modification of Figure 1 with a box-section and a widened top web forming a spring seat 190 with an upstanding flange 192 formed at each lateral edge of said web. On said spring seat may be positioned springs diagrammatically shown at 194 with a top spring plate 196 on which may be positioned the end of the bolster 198, said bolster end being a box-section with a top web 200, a bottom web 202, a side wall 204, and a central vertical web 206 parallel with said side wall. The bolster may be positioned with respect to the spring plate by means of the lugs 208 projecting downwardly through said plate and the bolster may be positioned with respect to the interlocking member 210 by means of the inboard and outboard vertical guide lugs 212 and 214 engaging as at 216 and 218 the lateral edges of the vertical portion 220 of said interlocking member. In this modification the outboard bolster guide lug 214 is also formed of restricted depth in order to permit the insertion or removal of the bolster through the bolster opening without disturbing the spring group and interlocking members on which it is seated. In this modification the interlocking member is generally similar to that shown in Figure 5 differing therefrom only in that the control arm 222 is thickened somewhat in order to adapt it for use as a friction member which may be worn in usage. In this modification the bottom web 224 of the interlocking member and control bar is, as in other modifications, recessed in the shallow cavity 226 formed in the bottom wall of the bolster and the reinforcing rib 228 of said insert member may likewise be received in the slot 230 in the bottom and side walls 202 and 204 of the bolster. The vertical portion 220 of the insert member is formed with an arcuate guide surface 232 which may engage the complementary guide surfaces 234, 234 formed on the adjacent side frame column at opposite sides of the vertical slot 236 through which may project the control arm 222 of the insert member.

The column guide surfaces 234, 234 may be widened somewhat between laterally projecting vertical inboard and outboard flanges 238 and 240.

Each side frame column is of general U-section with an arcuate transverse web 242, an inboard leg or web 244, and an outboard leg or web 246 merging at top and bottom respectively with the side walls of the compression member 180 and the tension member 182. On the inner and opposite faces of the inboard and outboard webs 244 and 246 may be formed friction shoe pockets 248 and 250, said pockets being defined by the top and bottom substantially horizontal flanges 252 and 254 and at opposite sides by the web 242 and the vertical flanges 256, 256 (Figure 8). Within each pocket thus formed may be housed a friction shoe 258, said shoes having on their opposed faces friction surfaces 260 which may engage the opposite sides of the control arm 222 positioned therebetween, said control arm being permitted vertical movement between said shoes, thus developing the desired frictional or snubbing action. On the opposite face of each friction shoe 258 may be formed a cavity 262 and a central positioning means 264 for the enclosed rubber pad 266, said pad being positioned on its opposite side by the stud 268 centrally raised on the pad 270 which forms a seat on the web 244 within the pocket 248 for said rubber pad.

In the modification shown in Figure 10 the section is generally similar to that shown in Figure 9 and the structure is the same except that the friction shoes 272, 272 are formed with oppositely tapering friction faces 274, 274 between which may be received the wedge-shaped end portion or control bar 276 of the interlocking member. By this arrangement greater resistance will be offered to downward movement of the control bar and the associated bolster end and to upward movement thereof, otherwise the modification of Figure 10 is similar to that of Figure 9 and includes the inboard and outboard column webs 278 and 280 on which are formed the pockets 282 and 284 receiving the rubber springs 286, 286 and portions of the before-mentioned shoes 272, 272. In the modifications shown in Figures 7 to 10 inclusive I may utilize an interlocking member and control bar of the general form shown in Figures 6 and 6A as already described.

In the embodiment shown in Figures 12 to 14 inclusive the side frame is a well-known truss type with the compression member 302 and the tension member 304 with the integral column 306 defining therewith the central bolster opening 308 and the end window opening 310. A compression member above the bolster opening is a substantially box-section with the lower web thereof cut away as at 312 for convenient foundry practice, and beneath the bolster opening the tension member is a box-section with a bottom web 314, an inboard wall 316, an outboard wall 318, and a top web 320 widened to form a spring seat 322 on which may be supported the spring plank 324, said spring plank being recessed as at 326 on each side to accommodate the secondary truss 328 of the side frame, the web of which extends through the column and merges with the top web of the tension member outwardly of the column as at 330. The bolster opening 308 is relatively wide at the lower portion thereof, the lower end of each column being offset as at 332 and bolster guide surfaces 334 are formed along the upper portions of the columns. Each column is of U-section with the transverse web 336 interrupted centrally thereof by the elongated slot 338 through which may extend the control arm 340 of the associated interlocking member generally designated 342 and the inboard web or wall 344 and the outboard wall 346 have a relatively great width in order to accommodate the rectangular pockets 348 and 350 formed on their inner faces respectively, said pockets being defined by horizontal and vertical flanges in manner similar to the modification in Figures 7, 8 and 9.

At the bottom of the bolster opening on the spring plank 324 may be supported coil springs diagrammatically indicated at 352, 352 and on said springs may be supported the end of the bolster 354. In the bottom wall of said bolster may be recessed as at 356 the overlapping end portions 358, 358 of the associated interlocking members 342, 342 each of said end portions having an upright bolster interlocking stud 360 extending through an opening 362 in the bottom wall of said bolster. The raised bottom walls at each side of the bolster may be cored away as at 364 to accommodate the vertical flange 366 on each interlocking member, each of said flanges serving as reinforcing means between the bottom web 368 and the upright portion 370 of the interlocking member, said upright portion having on one face thereof a bolster engaging surface 372 abutting the side wall of the bolster as at 374 and on the opposite face of said upright portion may be formed a column guide surface 376 with vertical flanges 378 and 380 in the outboard and inboard edges thereof for engagement as at 382 and 384 with the lateral edges of the adjacent column. On each side wall of the bolster may be formed a vertical shoulder for abutment as at 381 (Figure 13) with the inboard vertical edge of the interlocking member. Centrally of the upright portion 370 may be formed the vertical control arm in the form of the rectangular plate 340 already referred to.

Within the pockets 348 and 350 on the opposite inner faces of the column walls may be formed spring seats 386, 386 (Figure 13) affording abutment for the rubber springs 388, 388, said springs being formed as rectangular pads with their opposite faces abutting as at 390, 390 the spaced friction shoes 392, 392 whose friction surfaces may engage as at 394, 394 the opposite faces of the control arm 340. Spring positioning means 396, 396 may be formed on the spring seats 386, 386 as well as on the friction shoes 392, 392.

The embodiment illustrated in Figure 16 is substantially similar to that illustrated in Figure 9 with the difference that the compression springs are coils instead of rubber pads. In this view the section is taken in the vertical plane through the compression member 402, the tension member 404, and the column extending therebetween, said column having the outboard wall 406 and the inboard wall 408 with the brake hanger bracket 410, said inboard and outboard walls 406 and 408 merging at their lower ends with the top web 412 of said tension member. In this modification the inboard wall 408 is formed with a spring pocket 414 affording a seat as at 416 for the coil spring 418, the opposite end of which seats as at 420 against the adjacent face of the friction shoe 422. The wall 408 may be cored away as at 414 centrally of the spring pocket 414 for insertion of a tool which may have a hook end for engagement with the eye 426 centrally formed on the shoe 422, by which means the spring 418 may be compressed, thus facilitating application or removal of the control arm 428 the form of which is generally similar to those already described. The control arm 428 may have frictional engagement at opposite sides thereof with the inboard friction shoe 422 and the outboard friction shoe 430 respectively, said outboard friction shoe 430 affording a seat as at 432 for the compression spring 434, the opposite end of which may seat as at 436 against the spring cap 438 and be positioned thereon by means of the lug 440 centrally formed on said spring cap. The spring cap 438 may be grooved centrally thereof as at 442 for reception of the securing pin 444 extending through aligned openings on the spaced ears 446 and 448 at the top and the bottom of the spring cavity 450 which is formed in the outboard wall 406 of the column in alignment with the before-mentioned spring pocket 414.

The operation of the modification shown in Figure 16 is substantially identical with that of Figure 9 except that enlarged spring pockets are formed in the inboard and outboard walls of the columns for the reception of coil springs, which may thus be used in place of the rubber pads described for other modifications.

It is to be understood that I do not wish to be limited by the exact embodiments of the device shown which are merely by way of illustration and not limitation as various and other forms of the device will, of course, be apparent to those skilled in the art without departing from the spirit of the invention or the scope of the claims.

I claim:

1. In a railway car truck, a truss side frame having tension and compression members and spaced columns defining a central bolster opening and spaced window openings, a spring group on said tension member in said opening, a bolster extending into said bolster opening and seated on said spring group, interlocking members associated with said bolster and having upright end portions interlocked therewith and friction device control arms extending through transverse webs of the adjacent columns, said bolster having inboard and outboard lugs engaging said interlocking members, said outboard lugs having a depth less than the clearance at the top of said bolster opening above said interlocking members when positioned on said springs and free of superposed weight whereby said bolster may be elevated above said interlocking members and removed from said bolster opening while said interlocking members remain in assembly with said side frame, friction plates supported from said frame at opposite sides of each arm, friction shoes in engagement with respective plates, and resilient means between each shoe and said arm.

2. In a railway car truck, a truss side frame having tension and compression members and spaced columns defining a central bolster opening and spaced window openings, a spring group on said tension member in said opening, a bolster extending into said bolster opening and seated on said spring group, interlocking members associated with said bolster and having control arms extending through transverse webs of the adjacent columns, friction devices mounted in said columns and operable by said arms, each of said friction devices comprising inboard and outboard friction surfaces on said frame, friction shoes operable by said arms in engagement with said surfaces, and resilient means under compression between each arm and the adjacent friction shoes.

3. In a railway car truck, a truss side frame having tension and compression members and spaced columns defining a central bolster opening and spaced window openings, a spring group on said tension member in said opening, a bolster extending into said bolster opening and seated on said spring group, interlocking members associated with said bolster and having control arms extending through the adjacent columns, friction devices mounted in said columns and operable by said arms, each of said friction devices comprising spaced friction surfaces on opposite walls of the adjacent column, and friction shoes in engagement with said surfaces and operable by the adjacent arm.

4. In a railway car truck, a side frame having spaced columns defining a central bolster opening and spaced window openings, guide surfaces on said columns, a bolster extending into said bolster opening, members interlocked with said bolster and having guide faces engaging said surfaces, control arms on said interlocking members extending through said columns, and friction devices mounted in said window openings and operable by said control arms, each of said friction devices comprising spaced friction shoes actuated by the adjacent control arm, and resilient means under compression between each shoe and said adjacent control arm.

5. In a railway car truck, a side frame having spaced columns defining a central bolster opening and spaced window openings, guide surfaces on said columns, a bolster extending into said bolster opening, members interlocked with said bolster and having guide faces engaging said surfaces, control arms on said interlocking members extending through said columns, friction devices mounted in said window openings and operable by said control arms, each of said friction devices comprising friction surfaces mounted on opposite faces of said frame, friction shoes in frictional engagement with said surfaces, and a resilient pad between each shoe and the adjacent arm.

6. In a railway car truck, a side frame having spaced columns defining a central bolster opening and spaced window openings, guide surfaces on said columns, a bolster extending into said bolster opening, members interlocked with said bolster and having guide faces engaging said surfaces, control arms on said interlocking members extending through said columns, friction devices mounted in said window openings and operable by said control arms, each of said friction devices comprising friction surfaces mounted on opposite sides of said frame, friction shoes in engagement with said surfaces and operable by the adjacent control arm and resilient means under compression between each shoe and said adjacent arm.

7. In a railway car truck, a truss side frame comprising a bolster opening, a spring group on said frame in said opening, a bolster end supported by said group, actuators fixed to said end, friction devices mounted on said frame, each comprising spaced friction plates, friction shoes in engagement therewith, and resilient members engaged with respective shoes and clamping therebetween the associated actuator.

8. In a railway car truck, a side frame having a central bolster opening and spaced columns, vertical slots in the transverse webs of said columns, a bolster extending into said opening with side walls spaced from said columns, members interlocked with said bolster and having portions engaging the side walls of said bolster and guide surfaces engaging said columns, each of said interlocking members having a control arm extending through the adjacent column slot, friction devices mounted in said frame and operable by said arms, each of said interlocking members having a plane surface engaging the adjacent side wall of the bolster, and an arcuate surface engaging the adjacent column.

9. In a railway car truck, a side frame comprising a bolster opening, resilient means on said frame in said opening, a bolster end supported on said means, actuators fixed to said end, friction devices mounted on said frame, each comprising spaced friction plates, friction shoes in engagement therewith, and resilient members engaged with respective shoes, each of said actuators being connected between the resilient members associated with one of said devices.

10. In a railway car truck, a side frame having a central bolster opening and spaced columns, vertical slots in the transverse webs of said columns, a bolster extending into said opening with side walls spaced from said columns, members interlocked with said bolster and having portions engaging the side walls of said bolster and guide surfaces engaging said columns, each of said interlocking members having a control arm extending through the adjacent column slot, friction devices mounted in said frame and operable by said arms, each of said devices comprising spaced friction shoes, and resilient means compressed between said shoes and the adjacent arm.

11. In a railway car truck, a truss side frame having tension and compression members and spaced columns defining a central bolster opening and spaced window openings, a spring group on said tension member in said opening, a bolster extending into said bolster opening and seated on said spring group, interlocking members associated with said bolster and having control arms extending through the adjacent columns, friction devices mounted in said columns and operable by said arms, each of said friction devices comprising a plurality of friction shoes operable by the adjacent control arm, and resilient means associated with each of said friction shoes.

12. In a railway car truck, a truss side frame having tension and compression members and integral columns forming therewith a central bolster opening and spaced window openings, each of said columns having a bolster guide surface centrally formed thereon and spaced from said compression member, each column having a J-section including an arcuate transverse web with a vertical slot therein, a relatively wide inboard web affording a seat for an associated friction device, and a relatively narrow outboard web affording clearance for access to said friction device from the outboard face of said frame.

13. In a railway car truck, a truss side frame having tension and compression members and spaced columns defining a central bolster opening and spaced window openings, a spring group on said tension member in said opening, a bolster extending into said bolster opening and seated on said spring group, interlocking members associated with said bolster and having upright end portions interlocked therewith and control arms extending through the adjacent columns, and friction devices mounted in said columns and operable by said arms.

14. In a railway car truck, a side frame having tension and compression members and spaced columns defining a central bolster opening and spaced window openings, each of said columns having a general U-section with a transverse web interrupted by a vertical slot and inboard and outboard webs, said inboard web being windened to afford a friction surface accessible from the outboard side of said frame, and a friction panel supported on said frame opposite said friction surface.

15. In a railway car truck, a side frame having spaced columns defining a central bolster opening and spaced window openings, guide surfaces on said columns, a bolster extending into said bolster opening, members interlocked with said bolster and having guide faces engaging said surfaces, control arms on said interlocking members extending through said columns, and friction devices mounted in said window openings and operable by said control arms.

16. In a railway car truck, a truss side frame having tension and compression members and spaced columns defining a central bolster opening and spaced window openings, a spring group on said tension member in said opening, a bolster extending into said bolster opening and seated on said spring group, interlocking members associated with said bolster and having upright end portions interlocked therewith and arms extending through the adjacent columns, and friction means supported from said columns in said window openings, each of said friction means comprising a plurality of friction shoes operable by the adjacent arm.

17. In a railway car truck, a side frame having a central bolster opening and columns at opposite sides thereof, a bolster extending into said opening clear of said columns, members interlocked with said bolster with end portions engaging said bolster side walls and the adjacent columns, control arms on said interlocking members extending through said columns, friction means mounted in each of said columns, each of said friction means comprising spaced friction shoes operable by the adjacent control arm, and resilient means under compression between each shoe and the adjacent arm.

18. In a railway car truck, a side frame having a central bolster opening and spaced columns, vertical slots in the transverse webs of said columns, a bolster extending into said opening with side walls spaced from said columns, members interlocked with said bolster and having portions engaging the side walls of said bolster and guide surfaces engaging said columns, each of said interlocking members having a control arm extending through the adjacent column slot, friction means mounted in each of said columns and operable by said control arms respectively, each of said friction means comprising spaced friction shoes, and resilient means under compression between each shoe and the adjacent arm.

19. In a railway car truck, a side frame having a bolster opening and spaced columns, each of said columns having a general U-section with a transverse web having a vertical slot and inboard and outboard webs, and housings formed on the inner opposite faces of said inboard and outboard webs for associated friction shoes.

20. In a railway car truck, a side frame having spaced columns defining in part a central bolster opening, a bolster extending into said opening spaced from said columns, interlocking members associated with said bolster and in guiding engagement with said columns, each of said columns having a vertical slot and each of said interlocking members having a transverse arm extending through the adjacent slot, friction devices mounted on said columns for actuation by said arms, each of said friction devices comprising friction shoes spaced at opposite sides of the adjacent arm, resilient means under compression between each shoe and the adjacent arm, and positioning means on said shoes for the respective resilient means.

21. In a railway car truck, a side frame having tension and compression members and spaced columns defining a bolster opening, a bolster extending into said opening, interlocking members associated with said bolster and in guiding engagement with said columns respectively, friction devices mounted in each of said columns, each of said interlocking members having an arm for actuation of the adjacent friction device and each of said friction devices comprising friction shoes at opposite sides of the adjacent arm with interlacing means above and below said arm for engagement thereby, and resilient means associated with each of said shoes.

22. In a railway car truck, a truss side frame having tension and compression members and integral columns defining therewith a central bolster opening and spaced window openings, each of said columns comprising a transverse web with a vertical slot, friction devices mounted in said columns and accessible from said windows respectively, a bolster extending into said bolster opening, and interlocking members associated with said bolster and in guiding engagement with said columns respectively, each of said interlocking members having an arm extending through the adjacent slot for actuation of the adjacent friction device.

23. In a railway car truck, a truss side frame having tension and compression members and integral columns defining therewith a central bolster opening and spaced window openings, each of said columns comprising a transverse web with a vertical slot, friction devices mounted in said columns and accessible from said windows respectively, a bolster extending into said bolster opening, interlocking members associated with said bolster and in guiding engagement with said columns respectively, each of said interlocking members having an arm extending through the adjacent slot for actuation of the adjacent friction device, each of said friction devices comprising inboard and outboard friction panels supported on the adjacent column, friction shoes resiliently urged into engagement therewith, and means on each of said friction shoes overlying and underlying the adjacent arm.

24. In a railway car truck, a truss side frame comprising spaced columns partly defining a bolster opening and spaced window openings, aligned slots through said columns, a spring group on said frame in said bolster opening, a bolster end supported on said group, friction devices supported from said frame, and actuators fixed to said end, engaged with respective columns, and comprising arms extending through respective slots for actuation of respective friction devices.

25. In a railway car truck, a truss side frame comprising spaced upstanding columns partly defining a bolster opening and spaced window openings, slots through said columns, resilient means on said frame in said bolster opening, a bolster end supported on said resilient means, friction devices mounted on said frame in respective window openings, and actuators fixed to said end, engaged with respective columns, and comprising arms extending through respective slots for actuation of respective friction devices.

26. In a railway car truck, a side frame having a bolster opening and spaced columns, vertical slots in the transverse webs of said columns, a bolster extending into said opening with side walls spaced from said columns, members fixed to said bolster and comprising guide surfaces engaging said columns, each of said members having a control arm extending through the adjacent column slot, and friction devices mounted on said frame and operable by said arms.

ROBERT B. COTTRELL.